United States Patent [19]

Le Conte et al.

[11] Patent Number: 5,695,383

[45] Date of Patent: Dec. 9, 1997

[54] PROCESS FOR MODULATING THE BEHAVIOR OF WORKER BEES BY MEANS OF BROOD PHEROMONES

[75] Inventors: Yves Le Conte, Le Thor; Leam Sreng, Aubagne, both of France; Jérôme Trouiller, Burnaby, Canada; Serge Henri Poitou, Morieres-les-Avignon, France

[73] Assignee: Institut National de la Recherche Agronomique, Paris, France

[21] Appl. No.: 356,263

[22] PCT Filed: Jun. 16, 1993

[86] PCT No.: PCT/FR93/00595

§ 371 Date: Jan. 19, 1996

§ 102(e) Date: Jan. 19, 1996

[87] PCT Pub. No.: WO93/25070

PCT Pub. Date: Dec. 23, 1993

[30] Foreign Application Priority Data

Jun. 16, 1992 [FR] France ................................ 92 07283

[51] Int. Cl.⁶ .............................................. A01K 47/04

[52] U.S. Cl. ............................................. 449/2; 449/44

[58] Field of Search .............................. 449/2, 3, 42, 43, 449/44

[56] References Cited

U.S. PATENT DOCUMENTS 2,331,231 10/1943 Root et al. .................................. 449/44
4,651,372 3/1987 Schmidt ....................................... 449/2

*Primary Examiner*—Robert P. Swiatek
*Attorney, Agent, or Firm*—Nixon & Vanderhye P.C.

[57] ABSTRACT

A process for modulating the behavior of the worker bees of a rearing colony in an orphan or starter hive or in the orphan part of a hive, by incorporating a bouquet comprising one or more pheromones in the constitutive matter of the cupules, grafting of larvae in the cupules of a frame or comb enabling the larvae to be fed by the rearing colony, and placing the frame or comb in the orphan or starter hive or said orphan part of the hive in contact with the rearing colony. The invention also relates to a cupule of a comb or a frame for a starter or rearing hive, into which said cupule a bee larva may be grafted, having in its constitutive matter a bouquet comprising one or more pheromones.

39 Claims, No Drawings

PROCESS FOR MODULATING THE BEHAVIOR OF WORKER BEES BY MEANS OF BROOD PHEROMONES

It has already been suggested that the feeding behavior of worker bees was governed by signals, possibly chemical, emitted by the larvae themselves, such signals allowing the workers to detect the sex, the caste and the stage of development of the larvae being reared (cf., for example, Free, J. B., Winder, M. E.: Anim. Behav. 31, 539 (1983).

Ten molecules have recently been identified on the larvae of bees (Le Conte et al, 1989 Science, Vol. 245, pp. 638–639). Certain of these molecules have been characterized as brood pheromones triggering the capping behavior, by the workers, of cells containing 9-day-old larvae (Le Conte et al, 1990, Naturwissenschaften 77, 334–336). In the context of studies leading to this invention, it has been shown that these molecules are also present on younger larvae and that the bouquet of molecules evolves qualitatively and quantitatively in function of age. The workers' recognition of the age of the larvae appears to be based on the evolution of this bouquet.

The invention uses these observations to provide the means making it possible to orient or reorient the behavior of the workers in line with the particular purposes of the beekeeper, depending on whether he wishes to induce improved acceptance of the larvae at the beginning of rearing, to increase production of royal jelly, regulate the feeding of the larvae so as to favor the development of queen bees, etc., or even to favor several of these orientations simultaneously.

Before proceeding, it would appear appropriate to define a certain number of trade terms which will occur throughout this description. These terms are derived from those given by J. Freshaye in Bull. Tech. apic., 1975, 2, No.2, 15–30.

STARTER (or ORPHAN HIVE)

small hive with 4 or 5 frames, its bottom covered with wire mesh so as to allow no possible escape for the bees, which said hive is populated by a "packet of bees" (thus without queen bee) of approximately 1 kg to 1.5 kg and which makes it possible to start rearing of the royal jelly.

FINISHER (or BREEDING HIVE)

hive populated by a large colony and used for finishing of the royal cells once they have left the starter; the hive is divided by a vertical grill, preventing access by the queen, into two compartments, one of which, orphan with 4 or 5 frames, will receive the contents of the starter while the other is destined to house the rest of the colony, including the queen. For this purpose, very large hives with 15 or 17 frames are often used, thereby limiting the risks of swarming of the compartment containing the queen.

GRAFTING OF LARVAE expression used in beekeeping terminology to denote a simple transfer of young worker larvae from their original cell to a skeleton royal cell known as a cupule.

CUPULES these skeletons of royal cells are generally in wax but may also be in plastic material.

FAMILIARIZATION this operation consists of placing the empty cupules (previously fixed on small bars which are themselves placed in a "bar-holder" frame) in a normal colony. The bees of this colony will start constructing royal cells and will deposit a so-called "familiarization" substance which will facilitate their acceptance.

ACCEPTANCE acceptance takes place if the bees have begun the royal rearing of the transferred lava; the living larva and the royal jelly are present in the cell; the cupule is worked and attached to the support by wax reinforcements. Acceptance may be observed on the day following the operation of constructing the starter, at the time of its transfer to the rearing hive (finisher). The non-accepted larvae are destroyed by the bees of the rearing colony.

"CUPULE-HOLDER" BAR this is a small board of wood (similar to frame bottom in the super), covered on one side with a 4 to 5 mm slab of wax and on which the cupules are fixed prior to the familiarization operation.

These terminological questions having been resolved, the process, according to the invention, concerns the modification of the behavior of the worker bees of a rearing? colony in an orphan hive or starter or in the orphan part of a hive, this process comprising the grafting of larvae in the cupules of an appropriate frame or comb and the introduction of this frame, or comb in this frame, or comb in this starter or orphan part of a hive, to the contact of the rearing colony, and characterized by the incorporation of an efficient proportion of a bouquet based on one or several pheromones with the constitutive matter, particularly the wax of the said cupules, prior to the grafting of larvae into these cupules.

"Pheromone" is understood to mean any molecule, notably fatty acid ester or, aldehyde, or mixture of molecules of a type likely to be extracted from bee larvae by hexane, the molecules being capable of providing a signal for workers feeding larvae in the rearing of queens.

The results set out in Tables 1 and 2 below enable the trade professional to make preliminary choices as to the nature of the constituent(s) to be incorporated into the constitutive matter of the cupules, depending on the objective required. With regard to the frames used for carrying out the relevant tests, it should be noted that:

the techniques used in implementing the examples were practically identical to those described by J. Fresnaye in the article cited heretofore;

the frames were fitted with wax cupules;

the concentrations in pheromones are expressed as a percentage of weight in relation to the wax used;

the mixtures of esters were reconstituted from constituents identified in a total hexanoic extract of honey bee larvae, *Apis mellifica ligustica*, (female (worker) larvae and male (drone) larvae). As an example, a mixture in the following proportions:

| a) | methyl palmitate (PM) | 0.26 µg/Eql |
|---|---|---|
| b) | ethyl palmitate (PE) | 0.09 µg/Eql |
| d) | methyl stearate (SM) | 0.26 µg/Eql |
| f) | ethyl stearate (SE) | 0.08 µg/Eql |
| c) | methyl oleate (OM) | 0.07 µg/Eql |
| e) | ethyl oleate (OE) | 0.03 µg/Eql |
| g) | methyl linoleate (LNM) | 0.05 µg/Eql |
| h) | ethyl linoleate (LNE) | 0.01 µg/Eql |
| i) | methyl linolenate (LM) | 0.59 µg/Eql |
| j) | ethyl linolenate (LE) | 0.18 µg/Eql |

More specifically, the method of proceeding was as follows:

Each hive of the rearing colonies tested, chosen for their collecting abilities, was divided into two parts by means of a grill which workers, but not the queen, could cross. It is in the "orphan" part that royal rearing may take place.

Two sticks, on which wax cupules had previously been placed (Freshaye, 1975) were put into the orphan part of the hive, (25 cupules per stick). A drop of diluted royal jelly, then a young worker larva approximately one-day old, were successively placed in the bottom of each cupule. The larvae had been removed homogeneously in a frame from a colony whose ability to collect had previously been recognized.

After three days, the sticks were taken from the rearing colony so that the royal jelly deposited in the cupules by the workers could be extracted. The quantities of royal jelly deposited in the cupules containing accepted larvae and the larvae themselves were also weighed.

In this experiment, the fatty acid esters used, either individually or in a mixture whose proportions are specified above, were incorporated into the wax constituting the cupules. The mixing with wax was carried out when hot and at three concentrations: 1/100, 1/1000, 1/10000. These concentrations correspond either to those of the constituents, when these were used separately, or to that of the totality of the mixture of esters and, possibly, aldehydes corresponding to the larvae aged respectively three and eight days. Two aldehydes were, in fact, recently identified on the larvae. Control cupules, without esters, were also used for the purposes of comparison. The experiment was repeated on eight colonies on 11 different occasions. In all, 1452 cupules were tested, with a minimum of thirty cupules accepted per ester(s) and per concentration.

RESULTS

Significant differences were recorded, depending on the ester used, with respect to the percentage of larvae accepted by the workers, the weight of royal jelly deposited per accepted cupule, and the average weight of the larvae of three days of experimentation (Table 1).

The average acceptance percentage obtained of the cells varied, according to the ester used, between 79.2% and 46%.

The largest quantities of jelly obtained, on average per accepted cell, were observed with octodecanal at 1:10000, the mixture of ester+aldehydes at 1/1000 and LM at 1/10000.

The combination of the acceptance percentage and the quantity of jelly produced per accepted cells gives the average quantity of jelly gathered per grafted cell (Table 1).

The grouping of the concentrations for each ester underlines the interest of using methyl stearate because of its ability to promote both very good acceptance and an increase in the quantities of jelly deposited in the cupules (Table 2).

TABLE 1 effects of esters on royal rearing

| ESTER | concentration | % acceptance of cells | jelly/cell accepted (mg) | jelly/cell grafted (mg) | weight of larvae (mg) |
|---|---|---|---|---|---|
| OM | 1/10000 | 78.8% | 320.1 | 252.4 | 57.4 |
| SM | 1/1000 | 79.2% | 312.9 | 247.9 | 53 |
| PM | 1/1000 | 78.9% | 310 | 246.8 | 69.7 |
| OE | 1/10000 | 73.1% | 321.5 | 235.1 | 63.1 |
| SM | 1/100 | 75.5% | 307.9 | 232.3 | 59.6 |
| LM | 1/1000 | 66.7% | 335.8 | 223.9 | 64 |
| LNE | 1/100 | 70.9% | 314.2 | 222.8 | 68.2 |
| EICOSANAL | 1/10000 | 69.1% | 321.9 | 222.4 | 56.9 |
| OM | 1/100 | 67.3% | 330.1 | 222 | 56.9 |
| LNE | 1/10000 | 69.1% | 321.5 | 222 | 52 |
| PM | 1/10000 | 69.2% | 318.1 | 220.2 | 70.5 |
| OE | 1/1000 | 71.2% | 307.5 | 218.8 | 54.1 |
| LE | 1/100 | 65.4% | 332.9 | 217.6 | 73.3 |
| LNE | 1/1000 | 67.3% | 322.3 | 216.9 | 75.9 |
| ESTERS+ALD | 1/1000 | 59.6% | 364.1 | 216.7 | 73 |
| PE | 1/1000 | 67.3% | 320.4 | 215.7 | 51.8 |
| SE | 1/10000 | 63.6% | 334.5 | 212.9 | 45.5 |
| LM | 1/100 | 63.6% | 332.2 | 210.8 | 59.2 |
| EICOSANAL | 1/1000 | 69.2% | 302.1 | 209.2 | 61.6 |
| OCTODECANAL | 1/10000 | 56.4% | 368 | 207.4 | 72.7 |
| 10 ESTERS | 1/1000 | 70.9% | 291.9 | 207 | 64.9 |
| 10 ESTERS | 1/10000 | 68.5% | 300.9 | 206.2 | 61.6 |
| LNM | 1/1000 | 68.6% | 294.1 | 201.9 | 69.8 |
| SE | 1/1000 | 65.5% | 303.4 | 198.6 | 59.9 |
| PE | 1/10000 | 65.5% | 301.4 | 197.3 | 64.6 |
| CONTROL | | 63.3% | 306.6 | 194.2 | 61.1 |

TABLE 1-continued effects of esters on royal rearing

| CONTROL | | 63.3% | 306.6 | 194.2 | 61.1 |
|---|---|---|---|---|---|
| SE | 1/100 | 63.5% | 303.1 | 192.4 | 55.5 |
| SM | 1/10000 | 62.3% | 307.1 | 191.2 | 58.3 |
| SE | 1/100 | 60.0% | 317.1 | 190.6 | 56.8 |
| PM | 1/100 | 61.5% | 309.7 | 190.6 | 92.3 |
| LE | 1/10000 | 59.6% | 316.7 | 188.8 | 59.4 |
| EICOSANAL | 1/100 | 55.8% | 337.8 | 188.4 | 60.8 |
| ESTERS+ALD | 1/10000 | 65.9% | 285.1 | 187.9 | 60.8 |
| ESTERS+ALD | 1/100 | 64.7% | 284.3 | 183.9 | 86 |
| OCTODECANAL | 1/100 | 59.6% | 307.6 | 183.5 | 55.9 |
| OCTADECANAL | 1/1000 | 61.5% | 292.7 | 180.1 | 58.2 |
| LNM | 1/10000 | 57.7% | 311.2 | 179.5 | 59.6 |
| LNW | 1/100 | 55.8% | 318.5 | 177.6 | 72.7 |
| LE | 1/1000 | 59.3% | 290 | 171.8 | 58.4 |
| OM | 1/1000 | 56.6% | 298.9 | 169.2 | 56.1 |
| 10 ESTERS | 1/100 | 54.7% | 306.7 | 167.9 | 60.7 |
| PE | 1/100 | 53.8% | 303.4 | 163.4 | 55.2 |
| LE | 1/10000 | 46.2% | 343.9 | 158.7 | 64.4 |
| MEAN | | 64.6% | 314.3 | 202.9 | 63.4 |

☐ significantly lower values

▨ significantly higher values

TABLE 2 effects of ester on royal rearing (concentration taken together)

| ESTER | % acceptance of cells | Quantity (mg) of jelly/cell accepted | total jell/ cells grafted | weight of larvae |
|---|---|---|---|---|
| CONTROL | 63.3% | 306.6 | 194.2 | 61.1 |
| SM | 72.3% | 309.3 | 223.8 | 57.0 |
| LNE | 69.1% | 319.3 | 220.6 | 65.4 |
| PM | 69.9% | 312.6 | 218.4 | 77.5 |
| OE | 68.1% | 315.7 | 214.8 | 58.0 |
| OM | 67.6% | 316.4 | 214.5 | 56.8 |
| EICOSANAL | 64.7 | 320.6 | 206.7 | 66.4 |
| SE | 64.2% | 313.7 | 201.3 | 60.2 |
| LM | 58.8% | 337.3 | 197.8 | 62.5 |
| ESTERS + ALD | 63.4% | 311.2 | 196.2 | 62.5 |
| 10 ESTERS | 64.7% | 299.8 | 193.7 | 73.3 |
| LE | 61.4% | 313.2 | 192.7 | 62.4 |
| PE | 62.2% | 308.4 | 192.1 | 63.7 |
| OCTODECANAL | 59.2% | 322.8 | 190.3 | 57.2 |
| LNM | 60.7% | 307.9 | 186.3 | 62.3 / 67.4 |
| MEAN | 64.6% | 314.3 | 202.9 | 63.4 |

☐ significantly lower values

▨ significantly higher values

These results are at the origin of the modulation effect that appropriately adjusted concentrations of appropriately selected esters and/or aldehydes, taken separately or in mixtures, can exercise on the behavior of workers in an orphan hive, when these molecules are incorporated with the matter, notably wax, in the cupules. In particular, it was observed that:

(i) the workers, attracted by the molecules, can congregate in larger numbers around the treated cupules and increase the acceptance rate of larvae by the workers;

(ii) the molecules can stimulate the feeding behavior of the larvae, and in particular increase the amounts of royal jelly deposited in the cupules;

(iii) The workers' attraction towards the treated cupules may also be accompanied by a reduction in the risk of swarming.

The invention has revealed a plasticity in the production of royal jelly, governed by the esters used and the workers' ability to produce selectively a type and/or quantity of Jelly depending on the odor they perceive, particularly in relation to the pheromonal bouquet discharged by the larva according to its age.

In one of its variations, the invention provides apiarists with a simple method, based on the use of the said esters and/or aldehydes, making it possible to optimize the production of royal jelly both qualitatively and quantitatively. At the present time, the invention permits increases in royal jelly production, notably with bouquets of pheromones which are based principally on:

octodecanal, reconstituted mixtures of pheromones and aldehydes, methyl linoleate used in suitable concentrations in relation to the wax or other constitutive matter of the cupules.

Other preferred bouquets of pheromones are based on:

methyl or ethyl oleate, in concentrations ranging from $10^{-3}$ to $10^{-2}$ in weight compared to the constitutive matter, methyl palmitate, in a concentration of the order of $10^{-3}$ in weight.

After repeated tests, it emerged that increases in royal jelly production in the treated cupules were of the order of:

28% for methyl stearate,

25% for ethyl oleate and

12% for methyl palmitate per grafted cupule and in relation to the control cupules, at the end of a three-day larva feeding period. The royal jelly produced will preferably be collected no later than approximately 1 day before the capping of the cupules by the workers, that is to say approximately 3 days after grafting of the cupules.

The judicious choice of the esters and/or aldehydes of the type in question and of the their respective concentrations, opens up the prospect of optimizing the production of queens in artificial beekeeping conditions inasmuch as the development of these queens may be governed by a variation, notably by a faster increase in weight of the larvae destined to become queens, and even an increase in the percentage of accepted larvae (notably with methyl stearate). In point of fact, the variability of the weight of larvae in function of the esters, underlines the advantage of using these compounds for optimizing the production of queens and, notably, for improving the quantity and above all the quality of queens obtained in artificial rearing conditions. The technique for producing queens is thus identical, at least in its preliminary phase, to that for producing royal jelly. The cupules will be kept longer in the colony, during the period required for the future development of these queens.

In particular, when it is sought to increase the weight of the larvae being fed, recourse is advantageously made to a bouquet of pheromones based, principally, either on methyl palmitate, notably in a concentration of the order of $10^{-2}$, or on ethyl palmitate, notably in a concentration of the order of $10^{-3}$ in weight in relation to the above-mentioned constitutive matter.

The invention also concerns the cupules, notably for (or of) combs or frames for starter or rearing hives, in which said cupules bee larvae may be grafted, and which are characterized by the presence in their constitutive matter, notably wax, of one or several pheromones (bouquet) in selections and concentrations destined to modulate the behavior of the worker bees in a rearing colony.

These pheromones are usually incorporated with the said constitutive matter, notably wax, for example after mixture when hot. Preferred pheromones, used separately or in a mixture with other pheromones, at preferred concentrations, are listed above, notably in relation to preferred variations of the invention.

It is understood that the invention is not confined to these preferred cases.

Apiarists who are informed of the results provided in this description can now choose the most efficient pheromones and adjust their concentrations in the constitutive matter of the cupules so as to achieve the desired result in an effective manner, i.e. increased production of royal jelly, faster weight increase of larvae which are in the process of being fed, etc.

In this description, particular mention has been made of the incorporation of the pheromones with wax by means of mixture when hot. It is understood that any other form of incorporation, or even deposit on the constitutive matter of the cupules, may be envisaged provided that the olfactory result for the workers is approximately the same.

We claim:

1. A process for modulating the behavior of the worker bees of a rearing colony in an orphan or starter hive or in the orphan part of a hive, comprising grafting of larvae in the cupules of a frame or comb enabling said larvae to be fed by said rearing colony, placing said frame or comb in said orphan or starter hive or said orphan part of the hive in contact with said rearing colony, wherein said cupules comprise one or more pheromones in the constitutive matter of said cupules.

2. A process according to claim 1, wherein said bouquet of pheromones permits an increase of acceptance of larvae grafted by said worker bees.

3. A process according to claim 2, wherein said bouquet of pheromones is comprises a methyl stearate base.

4. A process according to claim 1, wherein said bouquet of pheromones increases the quantity of royal jelly produced by said worker bees.

5. A process according to claim 4, wherein said bouquet of pheromones comprises octodecanal.

6. A process according to claim 4, wherein said bouquet of pheromones comprises methyl oleate.

7. A process according to claim 4, wherein said bouquet of pheromones comprises a mixture of pheromones and aldehydes.

8. A process according to claim 4, wherein said bouquet of pheromones comprises methyl linoleate.

9. A process according to claim 4, wherein said bouquet of pheromones comprises methyl oleate at a concentration of $10^{-3}$ to $10^{-2}$ by weight relative to said constitutive matter.

10. A process according to claim 4, wherein said bouquet of pheromones comprises ethyl oleate.

11. A process according to claim 4, wherein said bouquet of pheromones comprises ethyl oleate at a concentration of $10^{-3}$ to $10^{-2}$ by weight relative to said constitutive matter.

12. A process according to claim 4, wherein said bouquet of pheromones comprises methyl palmitate.

13. A process according to claim 4, wherein said bouquet of pheromones comprises methyl palmitate at a concentration of $10^{-3}$ by weight relative to said constitutive matter.

14. A process according to claim 1, wherein said bouquet of pheromones allows a faster increase in the weight of larvae.

15. A process according to claim 14, wherein said bouquet of pheromones comprises methyl palmitate.

16. A process according to claim 14, wherein said bouquet of pheromones comprises methyl palmitate at a concentration of $10^{-2}$ by weight relative to said constitutive matter.

17. A process according to claim 14, wherein said bouquet of pheromones comprises ethyl palmitate.

18. A process according to claim 14, wherein said bouquet of pheromones comprises ethyl palmitate at a concentration of $10^{-3}$ by weight relative to said constitutive matter.

19. A process as in claim 1 wherein said constitutive matter is wax.

20. A cupule of a comb or a frame for a starter or rearing hive, into which said cupule a bee larva may be grafted said cupule comprising a bouquet comprising one or more pheromones in the constitutive matter of said cupule.

21. A cupule according to claim 20, wherein said bouquet of pheromones comprises methyl stearate.

22. A cupule according to claim 20, wherein said bouquet of pheromones comprises octodecanal.

23. A cupule according to claim 20, wherein said bouquet of pheromones comprises methyl oleate.

24. A cupule according to claim 20, wherein said bouquet of pheromones is comprises methyl palmitate.

25. A cupule according to claim 20, wherein said bouquet of pheromones comprises a mixture of pheromones and aldehydes.

26. A cupule according to claim 20, wherein said bouquet of pheromones comprises methyl linoleate.

27. A cupule according to claim 20, wherein said bouquet of pheromones comprises methyl oleate at a concentration of $10^{-3}$ to $10^{-2}$ by weight relative to said constitutive matter.

28. A cupule according to claim 20, wherein said bouquet of pheromones comprises ethyl oleate.

29. A cupule according to claim 20, wherein said bouquet of pheromones comprises ethyl oleate at a concentration of $10^{-3}$ to $10^{-2}$ by weight relative to said constitutive matter.

30. A cupule according to claim 20, wherein said bouquet of pheromones comprises methyl palmitate.

31. A cupule according to claim 20, wherein said bouquet of pheromones comprises methyl palmitate at a concentration of $10^{-3}$ by weight relative to said constitutive matter.

32. A cupule according to claim 20, wherein said bouquet of pheromones comprises methyl palmitate at a concentration of $10^{-2}$ by weight relative to said constitutive matter.

33. A cupule according to claim 20, wherein said bouquet of pheromones comprises ethyl palmitate.

34. A cupule according to claim 20, wherein said bouquet of pheromones comprises ethyl palmitate at a concentration of $10^{-3}$ by weight relative to said constitutive matter.

35. A cupule as in claim 20, wherein said constitutive matter is wax.

36. A cupule of comb or frame for a starter or rearing hive, into which said cupule a bee larva may be grafted, comprising a bouquet comprising one or more pheromones in the constitutive matter of said cupule at concentrations as to allow the modulation of the behavior of worker bees of a rearing colony to increase the quantities of jelly deposited in said cupule by said worker bees.

37. A cupule as in claim 36 wherein said constitutive matter is wax.

38. A process for modulating the behavior of the worker bees of a rearing colony in an orphan or starter hive or in the orphan part of a hive, comprising incorporating a bouquet comprising one or more pheromones in the constitutive matter of cupules of a frame or comb, grafting of larvae in said cupules of a frame or comb enabling said larvae to be fed by said rearing colony, and placing said frame or comb in said orphan or starter hive or said orphan part of the hive in contact with said rearing colony.

39. A process for modulating the behavior of the worker bees of a rearing colony in an orphan or starter hive or in the orphan part of a hive, comprising incorporating a bouquet comprising one or more pheromones in the constitutive matter of cupules of a frame or comb for the feeding of larvae by said rearing colony, grafting of larvae in said cupules of a frame or comb, and placing said frame or comb in said orphan or starter hive or said orphan part of the hive in contact with said rearing colony.

* * * * *